April 15, 1941.  C. M. SEMLER  2,238,825
VULCANIZING APPARATUS
Filed Dec. 29, 1937  3 Sheets-Sheet 1
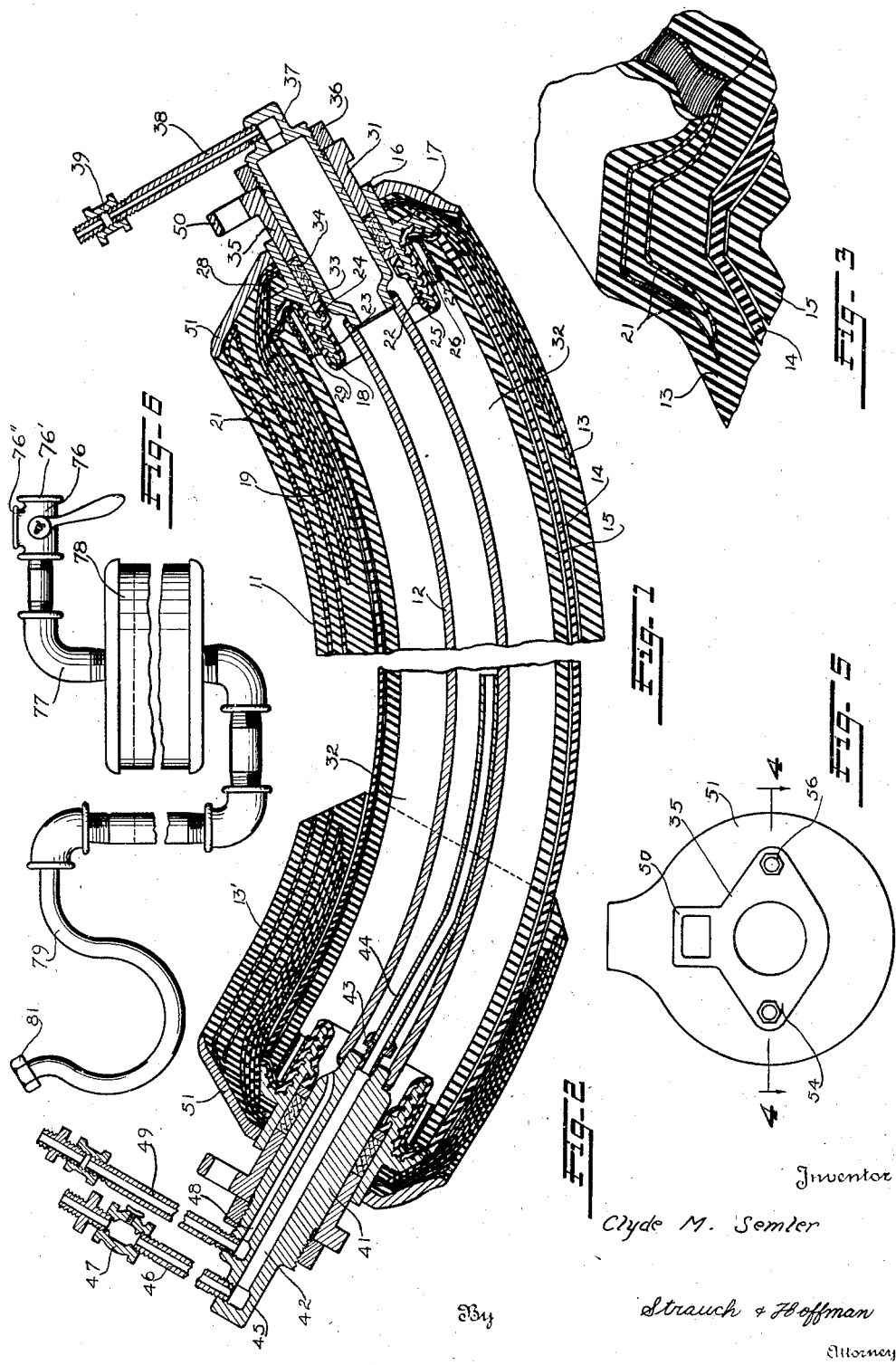
Inventor
Clyde M. Semler
By Strauch & Hoffman
Attorney

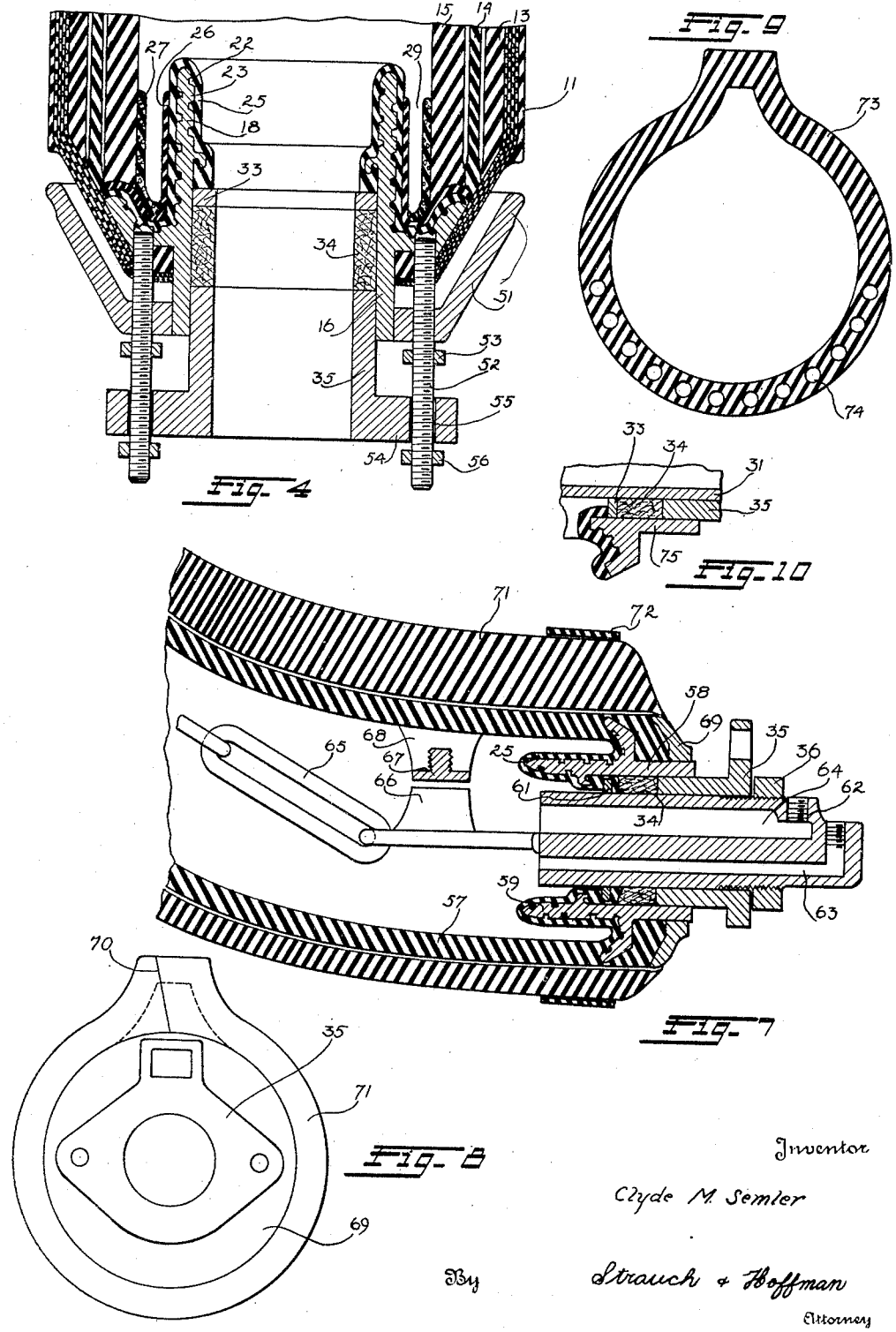

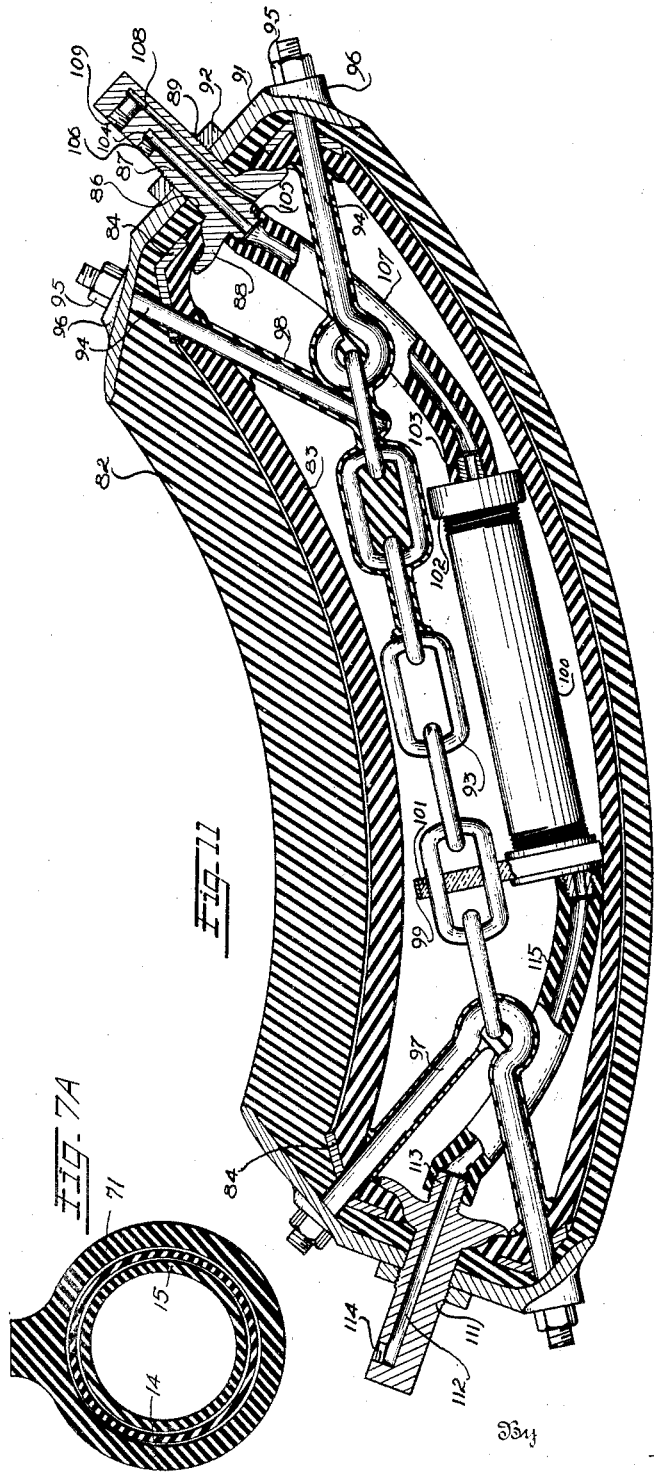

Patented Apr. 15, 1941

2,238,825

UNITED STATES PATENT OFFICE 2,238,825

VULCANIZING APPARATUS

Clyde M. Semler, Cuyahoga Falls, Ohio

Application December 29, 1937, Serial No. 182,316

13 Claims. (Cl. 18—45)

My invention relates to apparatus for repairing and curing rubber or rubber and fabric casings of the type designed to receive inflated inner tubes and is more particularly concerned with devices for curing and repairing pneumatic tires for wheeled vehicles.

Prior to this time many so-called tire repair bags adapted to provide a heated expansible core for holding a tire extended in firm contact with a vulcanizing mold have been used. Most of these devices are single elongated rubber or rubber and fabric bags fitted within the tire casing and expanded by air or steam pressure.

The greatest objection to prior devices of this type has been the fact that, after a relatively short period of use, these bags crack and fail to retain fluid under pressure especially at those places where constant flexing of the rubber takes place. Many attempts have been made to improve the life of these bags and much of the problem was solved by the device shown in my prior United States Patent No. 1,981,201, issued November 20, 1934, wherein I disclose, among other features, the use of corded reinforcements for end portions of the bag to prevent the ends of the bag from being torn away from the end assemblies and also to insure efficient sealing against escape of the pressure fluid at the connections with the end assemblies with very little interference with the tendency of the bag to expand radially. Said patent also reveals the idea of providing an expansible sleeve separable from the heating element so that worn out sleeves may be replaced instead of throwing the whole bag away when it is leaking.

The present invention is to be considered as an improvement over the similar prior devices described above and over the tire repair bags described in my above-mentioned patent.

In overcoming the defects of said prior devices it is a major object of my invention to provide a novel tire curing or repair bag which is durable and strong and whose life is exceedingly long as compared with those devices now in use for the same purpose.

It is a further object of my invention to provide a tire curing or repair bag having a novel sleeve construction which has a longer life than previously known sleeve structures.

A further object of my invention is to provide in a tire repair bag a novel multiple sleeve construction which distributes evenly stresses set up during expansion and thus increases the life of the bag.

Still a further object of my invention is to provide a tire curing or repair bag which has a novel arrangement for introducing fluid pressure into the interior of the bag.

A further major object of my invention is to provide a novel tire curing or repair bag which has a quickly removable outer sleeve so that a single tire bag of standard size may be provided at will with any one of a series of different sized sleeves for fitting accurately into tires of different internal diameter. These removable sleeves may be continuous along the length of the bag or they may comprise separate short sleeves, one at each end of the bag, but functioning to pad the bag up to a desired tire size.

A further object of my invention is to provide a tire curing or repair bag in which a novel arrangement of a heating unit inside the pressure container produces quick and efficient heating of the bag. Specifically my heating unit is immersed in the fluid within the bag in such a manner as to set up convection currents therein.

Still a further object of my invention is to provide a novel tire curing or repair bag which may be adapted to fit tires having the same external diameter but which vary slightly in internal diameter because of the different number of plies which are used in tires of different quality. These differences in internal diameter are compensated for by padding the bag, which may or may not have a removable sleeve, at each end to fit the tire. Accurate padding of this nature will prevent the bag from being injured or blown out upon inflation.

A further object of my invention is to provide a tire curing or repair bag which has a removable outer sleeve-containing heating means. This feature is advantageous where the sleeve is so thick as to fail to transmit proper heat from the central heating means.

A further important object of my invention is to provide a tire repair or curing bag having an expansible sleeve and internal heating means in which a novel end sealing construction is embodied to prevent escape of fluid pressure from the interior of the bag under all conditions of expansion and temperature.

Still a further object of my invention is to provide a novel packing gland construction between the expansible sleeve and the heater element of a tire curing or repair bag to accommodate for longitudinal movement of the inflated sleeve with respect to the heater element especially under high temperature conditions.

Further objects of my invention will become apparent as the description proceeds in connection with the annexed drawings and the appended claims.

Figure 1 is a longitudinal section of the right-hand side of a preferred form of tire bag constructed according to my invention and illustrating clearly the multiple sleeve arrangement as well as the end sealing means.

Figure 2 is a longitudinal section of the left side of a tire bag similar to Figure 1 but in which a pair of cord end caps instead of a continuous outer sleeve are employed.

Figure 3 is a fragmentary view in section and in perspective illustrating the sleeve construction at that part of the bag which normally contacts the tire bead.

Figure 4 is an enlarged section taken along line 4—4 in Figure 5 and illustrating a preferred manner of securing the metal end caps on the bag.

Figure 5 is an end view of the tire repair bag illustrating further the shape of the end fittings.

Figure 6 is a diagrammatic view of part of the fluid control system which is used to inflate the tire bag.

Figure 7 is a longitudinal section similar to Figure 1 but showing one end of a tire repair bag constituting another embodiment of the invention in which an external removable sleeve is mounted on the pressure container.

Figure 7A is a sectional view illustrating the removable sleeve of Figure 7 on a double sleeve basic bag.

Figure 8 is an end view of the pressure container of Figure 7 with the removable sleeve in place.

Figure 9 is a cross section illustrating another type of sleeve which may be mounted on the bags of Figure 1 or Figure 7 and which is provided with internal heating means within its walls.

Figure 10 is a fragmentary sectional view illustrating a modified form of collar at the end of the tire bag.

Figure 11 is a longitudinal section of a tire curing bag constructed according to my invention illustrating the use of an internal chain for maintaining the bag against excessive longitudinal expansion and showing a different manner of introducing heat into the bag.

Figure 12 is a fragmentary view in which the heating element forms a link in the chain of Figure 11.

Referring to Figure 1, the tire repair bag comprises a flexible expansible casing structure generally indicated at 11 surrounding a rigid heater tube 12. The expansible casing here shown consists of an external sleeve 13 and two internal sleeves 14 and 15. The whole casing structure is preferably shaped to conform to the contour of the inner wall of a conventional pneumatic automobile tire as shown in Figures 1 and 3, although it is obvious that casing 11 can be made to conform to the contour of any casing desired to be repaired or cured.

At each end of the casing, sleeves 13, 14 and 15 are firmly secured, as by vulcanizing, to a rigid end fitting 16 which is preferably in the form of a metal collar having an outwardly extending peripheral flange 17 of irregular cross section intermediate its ends. Collar 16 also preferably has an inner end portion 18 extending a substantial distance into the interior of the sleeve for a purpose to be described later.

Sleeve 13 is made of relatively hard flexible rubber and is preferably provided at its ends with layers of flexible reinforcing strands such as cords, or strings, chains, wire or any other suitable material preferably moulded within the rubber body of sleeve 13 and designated at 19. Such reinforced sleeve end construction is clearly disclosed in my aforementioned Patent No. 1,981,201. Additional reinforcing layers 21 are provided at the top beaded portion of sleeve 13 and these layers preferably run the whole length of sleeve 13.

Sleeves 14 and 15 respectively are of progressively smaller diameter than sleeve 13 as shown in Figures 1 and 3 and are preferably of very resilient soft slow curing rubber. Use of softer rubber in sleeves 14 and 15 in this type of bag is permissible because the internal sleeves are not exposed to external shocks and wear as is sleeve 13.

A preferred manner of securing casing 11 to a collar 16 will now be described. Referring to Figures 1 and 4, flange 17 and end portion 18 of collar 16 are provided with a plurality of surface grooves 22 and projections 23 facing toward the inner side of the bag. Collar 16 is also provided with a continuous internal flange 24 which is generally L-shaped in cross-section. A hollow rubber cap 25 is fitted over projection 18 so as to closely follow the contour of collar 16. One end of the rubber cap terminates interiorly of collar 16 just beyond flange 24. The other end of the cap extends to the tip of outer flange 17. A rubber collar 26 is snugly fitted about the outer surface of cap 25. The inner end of collar 26 terminates evenly with the end of cap 25 at the tip of flange 17.

During assembly of the casing 11, sleeves 14 and 15 are placed in a mold which already contains collar 16 surrounded by cap 25 and collar 26. The inner ends of sleeves 14 and 15 abut against the outer surface of collar 26. A short collar 27 preferably of fabric and rubber is disposed closely around the internal surface of sleeve 15 at its end and this collar also abuts collar 26. The mold is provided with a form portion which extends between sleeve 15 and the concentric portion of collar 26 for a purpose later to be described.

Sleeve 13 is placed about sleeve 14 and projects inwardly at its end to fit closely over collar 16. Between the outer end of flange 17 and the inner surface of sleeve 13 is preferably disposed an annular ring 28 of rubber.

With the parts in position as described above the whole assembly is subjected to a vulcanizing operation until a firm and permanent bond between the sleeves 13, 14, 15 and collar 16 is obtained. It will be obvious that the purpose of the various rubber members 25, 26 and 28 is to provide plenty of rubber adjacent the joint portions so that a good vulcanized connection can be obtained. Grooves 22 and projections 23 obviously provide a very great area of rubber to metal bonding surface and the various projections on collar 16 serve to mechanically aid the rubber to metal bond in resisting stresses. When the mold has been removed, it will be noticed that an annular space 29, the purpose of which will be described later, is left between sleeve 15 and collar 26. Collars 16 at each end of casing 11 may be secured thereto separately or simultaneously as desired.

I have described above only a preferred arrangement for effecting a secure bond between casing 11 and collar 16. Any equivalent vulcanizing or adhesive process may be used to secure the bond without departing from the spirit of the invention, the prime requisites being that the bond is fluid tight and mechanically strong. If desired, collars 26 and 27 may be secured to sleeves 14 and 15 before being placed in the mold, or any arrangement of the various parts which produces equivalent results may be used. The structure at each end of casing 11 is exactly the same.

The casing produced in the above manner is adapted to be placed about a rigid heating tube 12 which extends longitudinally within the casing and has securely fixed thereto at one end, as by welding, a substantially cylindrical fitting 31. Fitting 31 is of smaller diameter than collar 16 and extends coaxially therethrough. Tube 12 is of much smaller diameter than sleeve 15 and the space therebetween designated at 32 is adapted to be filled with a fluid such as air, steam, gas or water under pressure to inflate the tire bag.

A packing gland provides a fluid tight joint between fitting 31 and collar 16. Disposed about the interior of collar 16 is a rigid annular ring 33 which is preferably rigidly secured to collar 16. A preferred manner of mounting ring 33 is to vulcanize it to the end of cap 25 during the operation in which collar 16 is vulcanized to casing 11. The inner periphery of ring 33 is preferably in sliding engagement with fitting 31. An annular layer of compressible packing material 34 abuts against ring 33 and fills the space between fitting 31 and collar 16.

Metal sleeve 35 is slidably mounted upon fitting 31 and at its forward end extends between collar 16 and fitting 31 into engagement with packing 34. At its outer end fitting 31 is threaded to receive a nut 36 which, when tightened, forces sleeve 35 against packing 34 to thereby form a fluid tight joint.

Fitting 31 is provided at its outer end with an apertured extension 37 of reduced size in which is threaded an elongated nozzle 38 which is attached by a suitable fitting 39 to a source of steam or other hot fluid.

Fitting 41 shown in Figure 2 is a duplicate of that used at the left end of the casing of Figure 1 and is provided with a packing gland connection identical with that above described with respect to fitting 31. However, fitting 41 is of different internal construction than fitting 31 and contains a central bore 42 which is internally threaded at the inner end to receive a threaded connecting member 43. Tube 44, which is preferably flexible, is rigidly secured to member 43 and extends a substantial distance longitudinally of tube 12 and is supported by lying against the walls of tube 12. At its outer end fitting 41 is provided with a reduced extension 45 which is threaded to receive a nozzle 46. Secured to nozzle 46 is a pet cock assembly 47, the purpose of which will be described later.

Fitting 41 is further provided with a passage 48 offset from and generally parallel to bore 42. Passage 48 opens at its inner end to space 32 and at its outer end is threaded to receive a nozzle 49 which is adapted to be connected to the fluid pressure supplying outfit of Figure 6.

Removable end caps 51 of metal or some other rigid construction are mounted at each end of casing 11 and conform in shape to the end of casing 11. In Figure 4 these end caps are shown slightly separated from casing 11. Collar 16 is preferably provided with a plurality of tapped holes in which are mounted threaded studs 52. These studs may be mounted on collar 16 by welding or in any other desired manner, but it is preferable to provide removable studs which can be used after casing 11 has been discarded. Each end cap is provided with apertures to allow it to slide over collar 16 and studs 52. Nuts 53 are provided on studs 52 and when tightened they cause cap 51 to slide over collar 16 and studs 52 into engagement with casing 11.

Sleeve 35 is provided with a flange 54 having apertures 55 surrounding studs 52. Nuts 56 at the outer ends of studs 52 advance when rotated to force sleeve 35 inwardly against packing 34. It will be seen that nuts 56 act in conjunction with nut 36 to maintain sleeve 35 in position and prevent elongation of casing 11 when inflated. Each sleeve 35 may be provided with a handle portion 59 if desired.

When in operation casing 11 is placed inside the tire adjacent the part which is to be vulcanized and is inflated by introducing a fluid under pressure, preferably water, through passage 48. Apparatus for controlling the fluid flow will presently be described with reference to Figure 6. When a fluid heating medium such as steam is used, it is introduced through nozzle 38 and fitting 31. Tube 44 serves as a condensate drain and pet cock 47 provides a means by which the condensate may be removed from the interior of tube 12. With the tire held in extended position by inflated casing 11, the vulcanizing operation is performed.

I have found my multiple sleeve bag structure very efficient and durable. If only the single sleeve 13 were used as the pressure container as in prior devices, constant flexing would cause it to crack and leak, especially in those rubber areas where the end cords 19 terminate. This is due to the fact that the cords 19 tend to limit the radial expansion of the ends of casing 11 and allow free expansion of only a relatively short rubber section between those corded ends. It will be noted that sleeves 14 and 15 are held rigidly only at their ends and are free to stretch both longitudinally and circumferentially. Sleeves 14 and 15, being of relatively soft rubber, will withstand a great deal of flexing before developing leaks and hence will be fluid tight long after sleeve 13 has become cracked or porous. Furthermore, sleeves 14 and 15 exert a firm and uniform pressure upon the interior of sleeve 13 and relieve the stresses at the areas which normally fail. It will be evident that sleeves 14 and 15 will have a long life and, even when one sleeve fails, the other will continue to give service for some time thus further increasing the life of this tire bag.

The packing gland at each end of the casing provides a fluid tight joint which automatically compensates for relative longitudinal expansion of the parts when steam is admitted to tube 12.

Although I have shown sleeve 13 in Figure 1 as a continuous sleeve, it is within the province of my invention to make up sleeve 13 of two separate corded end sleeves 13' and I have shown one end of this embodiment in Figure 2. Where such corded end sleeves are used, inner tube 14 expands to take up the space therebetween and form a continuous surface for uniformly extending the tire. Except for the external sleeve construction the bag of Figure 2 is exactly the same as Figure 1.

Another modification of my invention is illustrated in Figure 7 where a rubber sleeve 57 is secured as by vulcanizing to an end collar 58. If desired, two concentric sleeves as at 14, 15 in Figure 1 may be used in place of sleeve 57, as illustrated in Figure 7A. Collar 58 is substantially the same as collar 16 of Figure 1 except that the rubber retaining grooves 59 thereon are here shown as dove-tailed but it is obvious that any desired form of groove may be used at will on either collar. The packing gland of Figure 7 is also substantially the same as that shown in Figure 1 with the exception that the annular retaining ring 61, corresponding to ring 33 in Figure 1, is of smaller external diameter than the interior of collar 58 so that part of the rubber cap 25, during vulcanizing, flows over the inner edge of ring 61 as shown in Figure 7 and forms a more secure attachment for the ring.

The heater fitting 62 of Figure 7 is provided with a condensate drain passage 63 and an entrance passage for the pressure fluid at 64, and is a substantial duplicate of fitting 41 of Figure 2. The internal heating means for the bag of Figure 7 may be the same as that shown in Figure 1, or if desired heating fluid such as steam may be used as the medium for inflating the bag. In such a case a flexible chain 65 connected between the end fittings limits the longitudinal expansion of the bag. Chain 65 is preferably provided with a stop 66 cooperating with a metal cap 67 secured to a rubber block 68 vulcanized to the inner wall of sleeve 57 for further limiting longitudinal expansion of the tire bag. Similarly the straight heating rod shown in my prior Patent No. 1,963,871 may be used as the heater element in Figure 7.

In any event it will be understood that the invention as embodied in Figure 7 is entirely independent of the particular internal heating means used. End caps 69 are secured to the end of the bag in Figure 7 in the same manner that the end caps 51 are secured in Figure 4.

Preferably, the pressure container of Figure 7 is substantially circular in cross-section and is used as a base or standard bag upon which different sizes of sleeves may be fitted to adapt the bag for use with different sized tires. If desired, moreover, the sleeve 57 may be substantially pear-shaped. Whatever the shape of sleeve 57, however, the inner periphery of the build-up sleeves will accord. Build-up sleeve 71 shown in Figures 7 and 8 fits over a substantially cylindrical sleeve 57. The dotted line in Figure 8 illustrates the appearance of a build-up sleeve fitted over a pear-shaped sleeve 57. If sleeve 71 is a trifle too small to fit in a desired tire the bag may be further built up by providing one or more end pads 72 fitted over the ends of sleeve 71. These pads 72 may comprise strips of desired width cut from an old inner tube and slipped over the end of sleeve 71. Another type of pad which is very useful is a short expansible sleeve which is split longitudinally at the top or bead section as illustrated at 70 in Figure 8 so as not to restrict the radial expansion to too great a degree. It will be obvious that when the bag is inflated, sleeve 71 is securely disposed about the pressure container and will not slip longitudinally.

In operation it will be seen that I may use any suitable size of sleeve at 71 to fit any desired internal tire diameter, providing pads 72, wherever such are necessary. While I have shown rubber sleeves at 57 and 71, I may use in either the corded end construction shown in sleeve 13 in Figure 1, but such will not be entirely necessary if the bag is padded to accurately fit the tire. Furthermore, sleeve 71 may comprise a pair of short end sleeves in the manner described with reference to sleeve 13' in Figure 2. These end sleeves may be corded or wholly of rubber as desired.

It sometimes happens that when a large sleeve is placed upon the pressure container of Figure 7 difficulty is experienced in getting proper heat out to the surface thereof. In such a case I propose to use in place of sleeve 71 the sleeve illustrated in Figure 9. Here sleeve 73 is provided with a series of internal heating tubes or passages 74 within its walls and in this manner the repair bag is maintained at the proper temperature during the vulcanizing operation.

The invention as illustrated in Figure 7 is of especial value when the bag must be adapted to fit a series of tires having the same external size but which, because of different ply construction, have different internal diameters. In such a case a sleeve 71 fitting the smallest internal tire diameter is slipped on sleeve 57 and the bag is then padded at the ends to fit the slightly larger diameters.

The removable sleeve 71 shown in Figure 7 may be equally well applied to the tire bags shown in Figures 1 and 2 or the bags of the prior art as illustrated by my above cited patents. For example, it may fit over sleeve 13 of Figure 1 or over sleeves 13' of Figure 2. Also, if desired, in the embodiment of Figure 7 loose corded end sleeves of the same construction as shown at 13' in Figure 2 may be used to fill the space between the ends of sleeve 71 and the edge of end caps 69.

In Figure 10 is illustrated a portion of a modified end collar 75 which may be used in place of either of collars 16 or 58. Collar 75 is substantially the same as collar 16 but omits therefrom the projection 18.

For admitting water into space 32 for inflating the casing the control system illustrated in Figure 6 is preferably used. A relatively large water tank or chamber 78 is disposed in one arm of a rigid U-shaped conduit 77 whose other arm is connected to a flexible conduit 79. A suitable fitting 81 at the end of conduit 79 connects the latter with nozzle 49 of casing 11. Tank 78 is filled with water to a suitable level indicated by the dotted line and air under pressure is introduced through opening 76' of the three-way valve 76 into conduit 77 from whence it passes into tank 78 above the water level.

Because of the pressure from above, water from tank 78 is displaced through conduit 79 and space 32 is entirely filled with water under pressure whereby the bag is inflated. Preferably tank 78 is provided with electrical or gas heating units (not shown) for preheating the water before introduction into the bag and if desired, a suitable thermostat control for maintaining the water at a desired temperature may be employed. When vulcanizing operations are completed, valve 76 is operated to release the compressed air through opening 76" and thus relieve the pressure within the interior of the bag.

If desired, hot water under pressure may be continuously circulated through space 32. To accomplish this, it is only necessary to provide, in place of fitting 81, a fitting similar to fitting 41 which is provided with a bore 48 and to which is attached a return conduit to tank 78. Water heating means could be disposed at any suitable location in such a system and any suitable arrangement, such as a pump or gravity system for promoting fluid circulation, may be used.

The embodiment of my invention illustrated in Figure 11 comprises a tire curing bag made up of an external sleeve 82, which may be provided, if desired, with cord end construction similar to that illustrated in sleeve 13 in Figure 1, and an internal sleeve 83 tightly secured preferably by vulcanization to sleeve 82 at adjacent ends only in the same manner that sleeve 15 is secured to sleeve 13 in Figure 1. Thus the inner portion of sleeve 83 is free to expand against the inner periphery of sleeve 82 between its ends.

An annular cup 84 of metal or other rigid material is securely imbedded in the connections between the sleeve ends. Preferably cup 84 which is concentric with the sleeves is entirely surrounded by rubber at the vulcanized joint between the sleeves.

The sleeve assembly above described terminates at one end in an aperture of reduced size 86 through which extends a fitting 87 having an enlarged flange 88 disposed inside sleeve 83 and a threaded portion 89 exteriorly of the bag. A suitable rigid end cap 91 apertured to slide over fitting 87 fits over the end of the sleeve assembly. Fitting 87 is securely held in place by tightening nut 92 on threaded portion 89 thus compressing flange 88 against the interior of sleeve 83. Any suitable means may be provided at aperture 86 for insuring against leakage of fluid from within sleeve 83. Flange 88 may be adhesively secured to sleeve 83, suitable packing material may be used to form a tight joint, or a packing gland construction similar to that shown at Figure 4 may be used.

A chain 93, disposed inside sleeve 83, has its opposite ends connected to suitable anchor bolt assemblies either of which may be in the form of a pair of eye bolts 94 or a single V-shaped bolt 97. Bolts 94 which are secured to one end link of chain 93 extend angularly through the sleeve construction and project externally of the bag through hollow bosses 96 adjacent the outer periphery of end cap 91. Nuts 95 fitted to the threaded ends of bolts 94 are tightened to securely hold end cap 91 in place.

Bolts 94, which pass through apertures in cup 84, may be secured in any desired manner, as by vulcanizing, to the sleeve assembly. Cup 84 provides a rigid support for bolts 94 intermediate their ends. If desired, cup 84 may be omitted altogether. Preferably those portions of bolts 94 inside sleeve 83 are covered by a coating of rubber 98 which also seals off the apertures through which the bolts enter sleeve 83 to prevent escape of fluid from the sleeve. Coating 98 also acts as a heat insulation to prevent heat from chain 93 from being conducted through bolts 94 exteriorly of the bag. If desired, chain 93 may be covered with rubber as shown at the right in Figure 11 but such is not necessary if a heat insulating material is disposed between the ends of the chain and the anchor bolts as shown at the left in Figure 11.

A heating unit comprising a cylindrical tube or pipe 100 of large diameter to present ample heating surface is preferably suspended by a hanger 99 from chain 93. If desired, heater tube 100 may be supported rigidly within sleeve 83 in some suitable manner as by attachment to the anchor bolts or by making conduits 107 and 115 rigid. Hanger 99 may be provided with heat insulating material 101 where it contacts chain 93 and tube 100. Tube 100 is threaded at each end to receive end caps 102 each of which is provided with a projecting threaded nozzle 103 having a passage communicating with the interior of tube 100. One of these nozzles is disposed adjacent the bottom edge of tube 100 for a purpose to be later described.

Fitting 87 is provided with a longitudinal passage 104 leading from an exterior nozzle fitting 106 to an externally threaded nozzle 105 on fitting 87 inside sleeve 83. A flexible conduit 107 extends between nozzles 103 and 105. Fitting 87 is also provided with a longitudinal passage 108 leading from an external nozzle connection 109 to the interior of sleeve 83.

At the other end of the bag the end construction is the same as above described with the exception that fitting 111 has only one passage 112 leading from a threaded nozzle 113 inside sleeve 83 to an exterior nozzle connection at 114. Flexible conduit 115 connects nozzle 113 with lower nozzle 103. Anchor bolt 97 is preferably coated with rubber in the same manner as bolts 94.

In operation the bag is inflated by introducing a suitable fluid, preferably water, under pressure through passage 108 into the interior of sleeve 83. Heat is provided internally of the bag by admitting a suitable heating fluid such as steam through passage 104 into tube 100. Since tube 100 is located at the bottom of sleeve 83 an effective circulation of water is obtained within sleeve 83 due to convection currents. This circulation tends to transfer heat quickly and effectively from the heating unit to the sleeve-walls. Condensate from the steam in tube 100 will collect upon the bottom and is drained off through conduit 115 and passage 112.

The chain and anchor bolt construction above described prevents excessive longitudinal expansion of the bag, and the stresses set up in the bolts upon inflation of the bag are evenly distributed upon opposite sides of the end caps. If desired a stop similar to that shown at 66 in Figure 7 may be used on chain 93.

The tire bag of Figure 11 may be used as a fluid pressure bag without heating means merely by omitting the heating unit 100 and supplying air or water under pressure through a suitable fitting in aperture 86. The opposite end of the bag would be sealed tight.

If desired, the bag of Figure 11 could be used as a steam bag by omitting heater 100 and conduit 107 and sealing off passage 108. In such a modification the free end of the condensate conduit 115 would be held at the bottom of the sleeve by a weight or some other suitable means.

Furthermore, the heating unit 100 may contain an electrical heating coil using the described steam passages as electrical wire conduits.

In Figure 12 is disclosed a form of heating unit which may be used in the bag of Figure 11. Instead of suspending the unit from the chain as in Figure 11, the unit designated at 116 is inserted as a link in the chain. Unit 116 comprises a cylindrical pipe 117 of much larger diameter than pipe 100, threaded at opposite ends to receive end caps 118. Each end cap 118 is provided adjacent its top edge with an axially extending apertured ear 119 and this ear 119 is connected by one or more chain links 121 to anchor bolts 94 or 97. Near their bottom edges, caps 118 are provided with nozzles 122 similar to nozzles 103 for the passage of steam.

The construction shown in Figure 12 is quite effective in that it provides a very large heating surface area within the bag and effectively eliminates the need for a long chain. Furthermore, with a large heater whose surfaces are near the sleeve walls the transfer of heat is speedy and efficient.

From the above it will be seen that I have provided a tire repair bag which is durable and strengthened at each end to prevent blowout. The multiple sleeve construction greatly lengthens the life of the bag and the bag can be adapted to fit any number of internal tire sizes by use of removable sleeves and pads as above described.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a tire repair bag having an elongated expansible, resilient sleeve and means for introducing a fluid under pressure within said sleeve, means restricting longitudinal expansion of said sleeve and removable and replaceable expansible, relatively short end sleeves spaced from each other and surrounding opposite ends only of the elongated expansible sleeve for reinforcing the ends of said sleeve and for adapting the bag to fit accurately tires of different internal diameter.

2. Tire repair apparatus comprising in combination an expansible tubular bag closed at its ends, said bag having sufficient rigidity to normally maintain its shape when its interior is open to the atmosphere and being provided with means restricting longitudinal expansion of said bag; an expansible and removable sleeve loosely mounted about said bag, said sleeve being of sufficient rigidity to normally retain its shape independently of said bag and said sleeve having its external surface shaped in accordance with the tire to be repaired and being readily removable to allow substitution of sleeves of different size to adapt the bag to fit within tires of different internal diameters and cross sections, and means for introducing fluid under pressure into the interior of said bag to expand the latter into intimate surface engagement with the inner surface of said sleeve.

3. A tire repair bag comprising in combination, an expansible sleeve closed at its ends and provided with means for restricting its longitudinal expansion; a second expansible sleeve, coextensive with said first sleeve and having an external contour corresponding to the tire to be repaired, loosely mounted about said first sleeve; means for introducing fluid under pressure within said first sleeve to expand it into surface contact with said second sleeve and resilient pad sleeves surrounding said second sleeve at opposite ends thereof for adapting the bag to accurately fit a desired internal tire size.

4. A tire repair bag comprising a pair of concentric expansible rubber sleeves, rigid metal end fittings at opposite ends of said bag and means extending through said bag between said fittings for restricting elongation of said bag, each fitting and the adjacent sleeve ends being secured together by a fluid tight vulcanized joint, and said sleeves being free intermediate their ends to permit the intermediate portion of the inner sleeve to move relative to the intermediate portion of the outer sleeve, and means for introducing fluid under pressure within said inner sleeve.

5. In a tire bag, a pair of rigid end fittings; an expansible sleeve extending between said fittings; a second expansible sleeve surrounded by said first sleeve and substantially coextensive therewith, said sleeves being secured to each other at adjacent ends and being relatively free intermediate their ends; means for introducing fluid under pressure within said second sleeve; a third expansible sleeve surrounding said first sleeve, said third sleeve being readily removable from about said first sleeve; and means providing a plurality of heating fluid conducting passages in the walls of said third sleeve.

6. In a tire bag, a pair of rigid end fittings; an expansible sleeve extending between said fittings; a second expansible sleeve surrounded by said first sleeve and substantially coextensive therewith, said sleeves being secured to each other at adjacent ends and being relatively free intermediate their ends; means for introducing fluid under pressure within said second sleeve; and a third expansible sleeve surrounding said first sleeve, said third sleeve being of such construction as to be readily removable from about said first sleeve.

7. In the tire bag defined in claim 6, heater means in the walls of said third sleeve.

8. Tire repair apparatus comprising, in combination, a relatively resilient rubber bag capable of uniform expansion, caps closing opposite ends of said bag, a flexible connection extending through said bag between said caps for restricting longitudinal expansion of said bag, said bag having sufficient rigidity to normally maintain its shape when its interior is open to the atmosphere, an expansible and removable sleeve loosely mounted about said bag, said removable sleeve being of sufficient rigidity to normally retain its shape independently of said bag and having its external surface shaped in accordance with the tire to be repaired and being readily removable to allow substitution of sleeves of different size to adapt the bag to fit within tires of different internal diameters and cross sections, and means for introducing fluid under pressure into the interior of said bag to expand the latter into intimate surface engagement with the inner surface of said removable sleeve.

9. Tire repair apparatus comprising in combination, an expansible tubular bag closed at its ends, said bag having sufficient rigidity to normally retain its shape when its interior is open to the atmosphere and being provided with means restricting longitudinal expansion of said bag; an expansible and removable sleeve loosely mounted about said bag, said sleeve being of sufficient rigidity to normally retain its shape independently of said bag and being split longitudinally so as to be easily removable to allow substitution of sleeves of different size to adapt the bag to fit tires of different internal diameters, and said sleeve serving also to control expansion of the bag when the latter is subjected to internal fluid pressure; and means for introducing fluid under pressure within said bag to expand it into intimate surface contact with said sleeve.

10. A tire repair base bag comprising a pair of elongated, expansible, resilient sleeves disposed one within the other, rigid end fittings at opposite ends of the bag and means extending through the bag between said fittings for restricting elongation of said bag, each fitting and the adjacent sleeve ends being secured together by a fluid tight joint and said sleeves being free intermediate their ends to permit the intermediate portion of the inner sleeve to move relative to the intermediate portion of the outer sleeve, and means for introducing fluid under pressure within said inner sleeve.

11. Tire repair apparatus comprising in combination an expansible tubular bag closed at its ends, said bag having sufficient rigidity to normally retain its shape when its interior is open to the atmosphere and being provided with means for restricting longitudinal expansion thereof, an expansible and removable sleeve loosely mounted about said bag, said sleeve being of sufficient rigidity to normally retain its shape independently of said bag and being pre-formed to fit snugly on said bag and shaped externally to fit within the tire to be repaired, heater means within the walls of said sleeve, and means for introducing fluid under pressure into the interior of said bag to expand it into intimate surface contact with said removable sleeve.

12. In the tire repair apparatus defined in claim 11, said heater means comprising a plurality of heating fluid conducting passages in the walls of said removable sleeve.

13. Tire repair apparatus comprising an expansible tubular base bag which is pressure tight and provided with means restricting longitudinal expansion thereof, said bag having sufficient rigidity to normally maintain its shape when its interior is open to the atmosphere; and a removable and expansible sleeve loosely mounted upon said bag, said sleeve being of sufficient rigidity to normally retain its shape independently of said bag and being externally shaped to fit within a tire to be repaired and having an integral longitudinally split bead portion.

CLYDE M. SEMLER.